United States Patent
VerDught et al.

(10) Patent No.: US 12,391,319 B2
(45) Date of Patent: Aug. 19, 2025

(54) APPARATUS AND METHOD OF REMOVING A TRANSMISSION FROM AN ARTICULATED WORK VEHICLE

(71) Applicant: DEERE & COMPANY, Moline, IL (US)

(72) Inventors: Jared E. VerDught, Cedar Falls, IA (US); Dennis A. Bowman, Denver, IA (US); Jacob J. Foxen, Parkersburg, IA (US); Jade E. Bender, Waterloo, IA (US); Jason L Pedersen, Waverly, IA (US); Kurt M. Schmitz, Jesup, IA (US)

(73) Assignee: DEERE & COMPANY, Moline, IL (US)

( * ) Notice: Subject to any disclaimer, the term of this patent is extended or adjusted under 35 U.S.C. 154(b) by 483 days.

(21) Appl. No.: 18/066,435

(22) Filed: Dec. 15, 2022

(65) Prior Publication Data

US 2024/0199146 A1   Jun. 20, 2024

(51) Int. Cl.
*B62D 55/06* (2006.01)
*B60K 17/04* (2006.01)
*B60K 17/24* (2006.01)
*B62D 55/065* (2006.01)
(Continued)

(52) U.S. Cl.
CPC .......... *B62D 55/0655* (2013.01); *B60K 17/04* (2013.01); *B60K 17/24* (2013.01); *B62D 55/084* (2013.01); *B62D 65/00* (2013.01)

(58) Field of Classification Search
CPC .. B62D 55/0655; B62D 55/084; B62D 65/00; B60K 17/04; B60K 17/24
See application file for complete search history.

(56) References Cited

U.S. PATENT DOCUMENTS

| | | | |
|---|---|---|---|
| 8,939,250 B2 | 1/2015 | Turner et al. | |
| 2005/0082070 A1* | 4/2005 | Juncker | B62D 55/305 |
| | | | 172/684.5 |
| 2017/0291652 A1* | 10/2017 | Marchildon | B62D 55/108 |

(Continued)

FOREIGN PATENT DOCUMENTS

| | | | |
|---|---|---|---|
| DE | 102007007518 A1 | 8/2008 | |
| DE | 102019215806 A1 | 4/2020 | |
| WO | WO-2014210581 A1 * | 12/2014 | B62D 33/03 |

OTHER PUBLICATIONS

Deere & Company, Technical Manual for 7600, 7700, and 7800 Tractors, dated Nov. 4, 1996, pp. 124-133.
(Continued)

*Primary Examiner* — Zakaria Elahmadi (57) ABSTRACT

An articulated work vehicle includes a front portion including a front set track assemblies, a rear portion including a rear set track assemblies, a power source installed in the front portion, a transmission installed in the front portion, a use mode, and a service mode. In the used mode, the rear portion is pivotally connected to the front portion and the transmission is operably connected to the power source, the front set of track assemblies, and the rear set of track assemblies. In the service mode, the rear portion is disconnected from the front portion, the transmission is disconnected from the front set of track assemblies, the transmission is removed from the front portion, and the transmission remains pivotally connected to the rear portion.

15 Claims, 10 Drawing Sheets

(51) Int. Cl.
 *B62D 55/084* (2006.01)
 *B62D 65/00* (2006.01)

(56) References Cited

U.S. PATENT DOCUMENTS

2019/0308677 A1\* 10/2019 Murfey ................ B62D 55/084
2021/0094617 A1\* 4/2021 Hertsgaard .............. B60K 5/00

OTHER PUBLICATIONS

Deere & Company, Repair Technical Manual for 6230-7230 Tractors, dated Feb. 1, 2013, pp. 596-606.
German Search Report issued in application No. 102023127559.3 dated Jun. 13, 2024, 10 pages.

\* cited by examiner

APPARATUS AND METHOD OF REMOVING A TRANSMISSION FROM AN ARTICULATED WORK VEHICLE

FIELD OF THE DISCLOSURE

The present disclosure relates to an apparatus and method of removing a transmission from a work vehicle.

BACKGROUND

Work vehicles include transmissions positioned between a power source and the wheels or track assemblies. Transmissions can be removed from the work vehicles for service or replacement.

SUMMARY

According to an aspect of the present disclosure, an articulated work vehicle includes a front portion having a front set track assemblies, a rear portion having a rear set track assemblies, a power source installed in the front portion, a transmission installed in the front portion, a use mode, and a service mode. In the use mode, the rear portion is pivotally connected to the front portion and the transmission is operably connected to the power source, the front set of track assemblies, and the rear set of track assemblies. In the service mode, the rear portion is disconnected from the front portion, the transmission is disconnected from the front set of track assemblies, the transmission is removed from the front portion, and the transmission remains pivotally connected to the rear portion.

According to an aspect of the present disclosure, the articulated work vehicle includes an operator station connected to the front portion.

According to an aspect of the present disclosure, the articulated work vehicle includes an alternate power source operably connected to the rear set of track assemblies in the service mode.

According to an aspect of the present disclosure, the articulated work vehicle includes an alternate power source operably connected via an alternate gearbox to the rear set of track assemblies in the service mode.

According to an aspect of the present disclosure, the articulated work vehicle includes one or more actuators pivotally connected to the transmission and the rear portion in the use mode and the service mode.

According to an aspect of the present disclosure, the articulated work vehicle includes a front support supporting the front portion in the service mode, and a rear support supporting the rear portion in the service mode. The rear support includes one or more wheels or rollers.

According to an aspect of the present disclosure, the articulated work vehicle includes a drive shaft operably connecting the transmission to the rear set of track assemblies in the use mode, and an alternate power source operably positioned in place of the drive shaft in the service mode.

According to an aspect of the present disclosure, a method of removing a transmission from an articulated work vehicle includes disconnecting a rear portion of the articulated work vehicle including a rear set of track assemblies from a front portion of the articulated work vehicle including a front set of track assemblies, disconnecting the transmission from the front portion while the transmission remains pivotally connected via one or more actuators to the rear portion, and powering via an alternate power source the rear set of track assemblies to remove the transmission from the front portion in a rearward direction.

According to an aspect of the present disclosure, the alternate power source includes an alternate gearbox having a reduction gear set.

According to an aspect of the present disclosure, the method includes removing a drive shaft operably connecting the transmission to the rear set of track assemblies, and positioning the alternate power source in place of the drive shaft.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

With reference to FIGS. 1-9, a work vehicle 100 (e.g., an agricultural tractor) can include an operator station or cab 102, a hood 104, one or more ground engaging apparatus 106 (e.g., wheels, track assemblies, etc.), and an articulated frame or chassis 110. The work vehicle 100 can include one or more power sources 108 (e.g., an internal combustion engine, a hybrid engine, a battery and electric machine, etc.). The work vehicle 100 can include a transmission 112 transferring power from the one or more power sources 108 to a drivetrain, which includes the ground engaging apparatus 106 and one or more power take off (PTO) shafts 114 or other auxiliary power outputs or inputs. The transmission 112 can include a transmission housing 148. The transmission 112 can include one or more electric or hydraulic machines. The work vehicle 100 can include an operator interface having any number and combination of electronic devices, such as an interactive display. This disclosure also applies to other types of work vehicles in agriculture, construction, forestry, and road building.

The work vehicle 100 can include a front portion 120 with one or more track assemblies 106 and rear portion 130 with one or more track assemblies 106. The front portion 120 can include a front set of track assemblies 122 (e.g., a left track assembly and a right track assembly) and the rear portion 130 can include a rear set of track assemblies 132 (e.g., a left track assembly and a right track assembly). The power source 108 and the transmission 112 can be installed in the front portion 120. The operator station 102 can connect or attach to the front portion 120. The operator station 102 can be omitted or excluded in some implementations (e.g., autonomous vehicles). The work vehicle 100 can include one or more front axles 116 and one or more rear axles 118. The rear portion 130 can rotatably or pivotally connect to the front portion 120 at one or more connections 140 (e.g., a lower connection 140 and an upper connection 142). The front and rear portions 120, 130 can rotate or pivot relative to each other about an axis of rotation 180 located at the lower and upper connections 140, 142.

One or more actuators 144 (e.g., hydraulic, pneumatic, electric, etc.) can rotatably or pivotally connect to the front and rear portions 120, 130. The one or more actuators 144 can rotatably or pivotally connect to the transmission housing 148. The one or more actuators 144 (e.g., a left actuator and a right actuator) can rotate or pivot the front and rear portions 120, 130 relative to each other about the axis of rotation 180 at the lower connection 140 and the upper connection 142. The one or more actuators 144 can rotate or pivot the rear portion 130 relative to the front portion 120, or vice versa.

Figure 1:
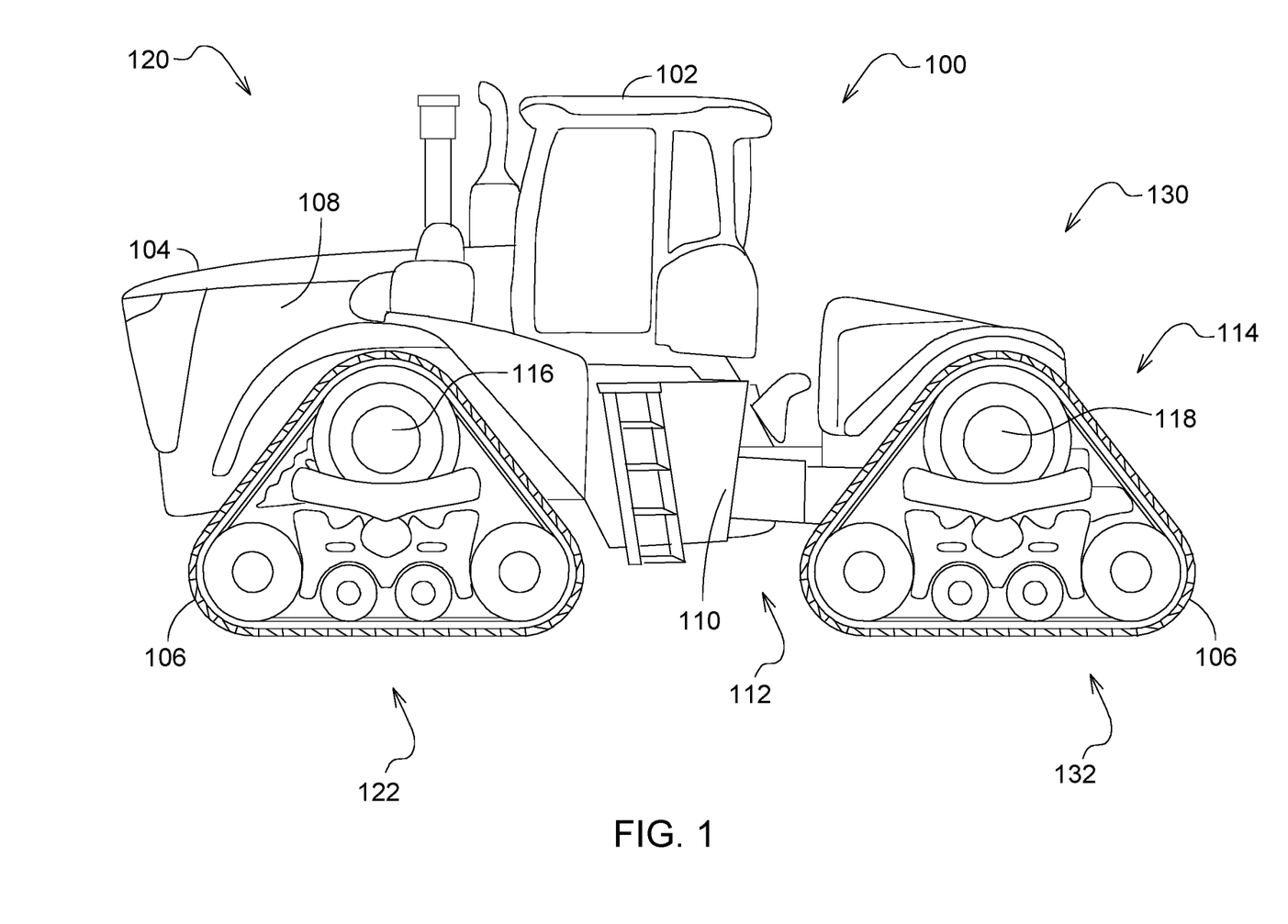
FIG. 1 is a perspective view of a work vehicle, according to an implementation.
Figure 2:
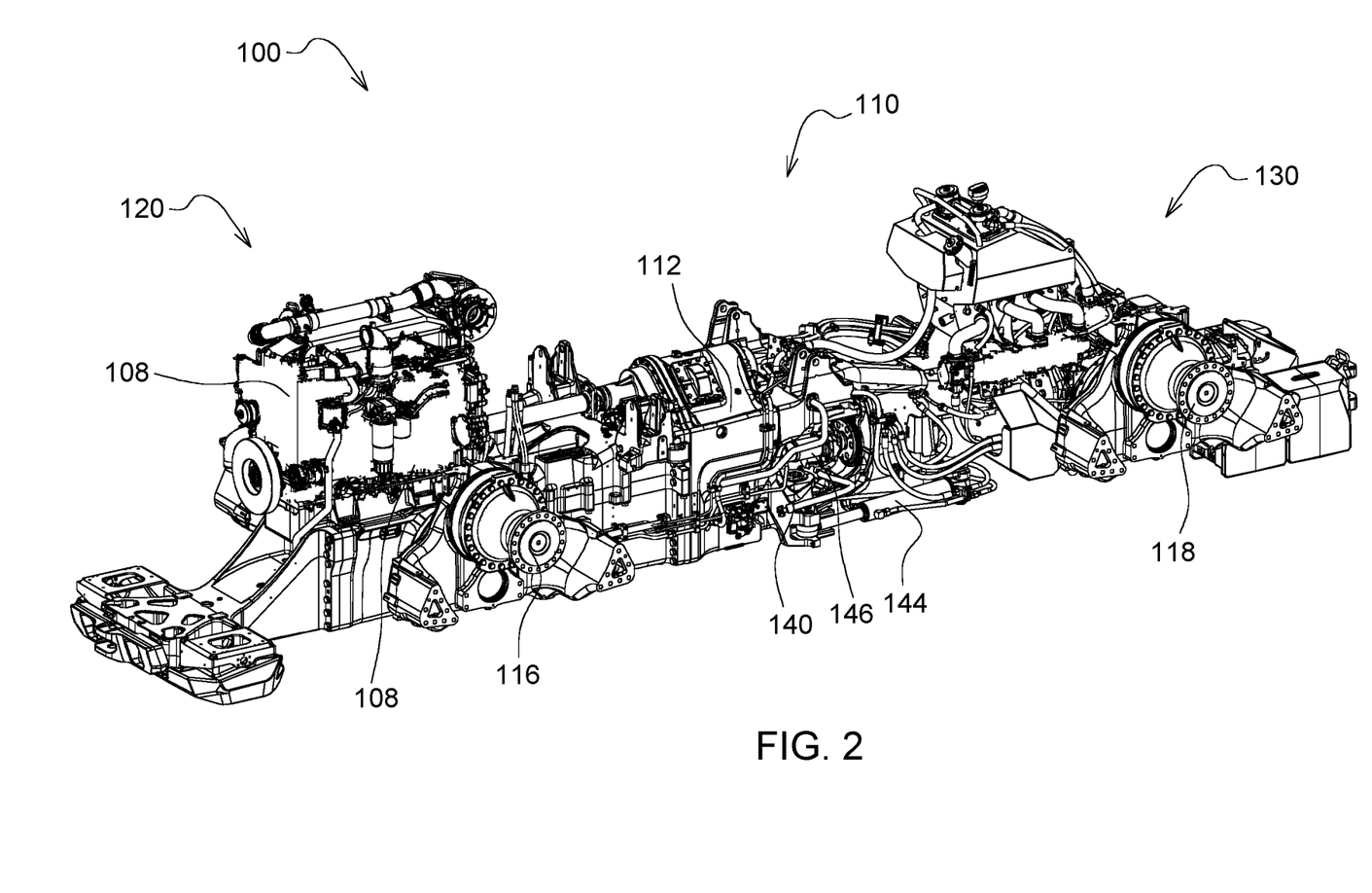
FIG. 2 is a perspective view of a chassis for a work vehicle, according to an implementation.
Figure 3:
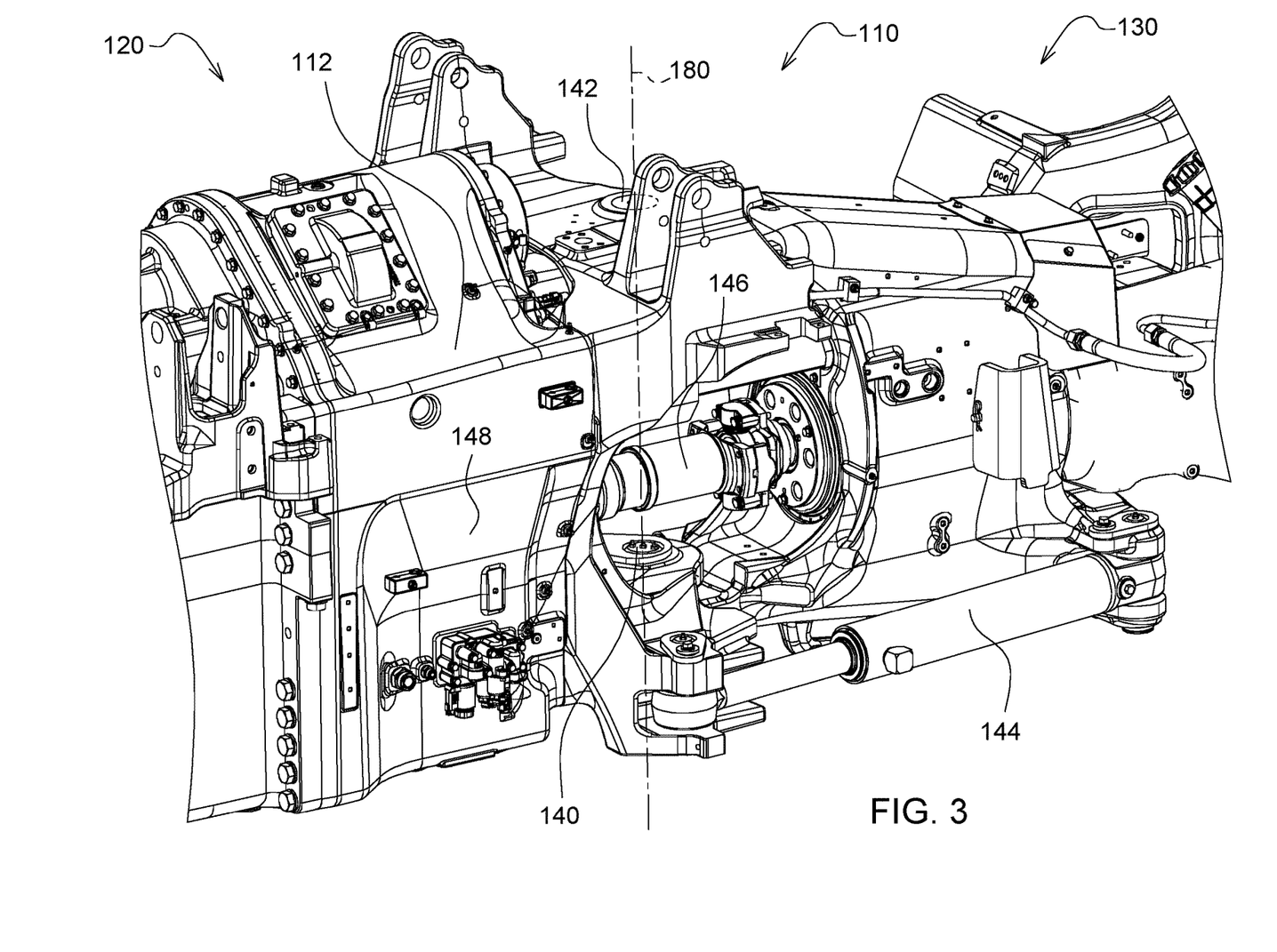
FIG. 3 is a front perspective view of a chassis for a work vehicle, according to an implementation.
Figure 4:
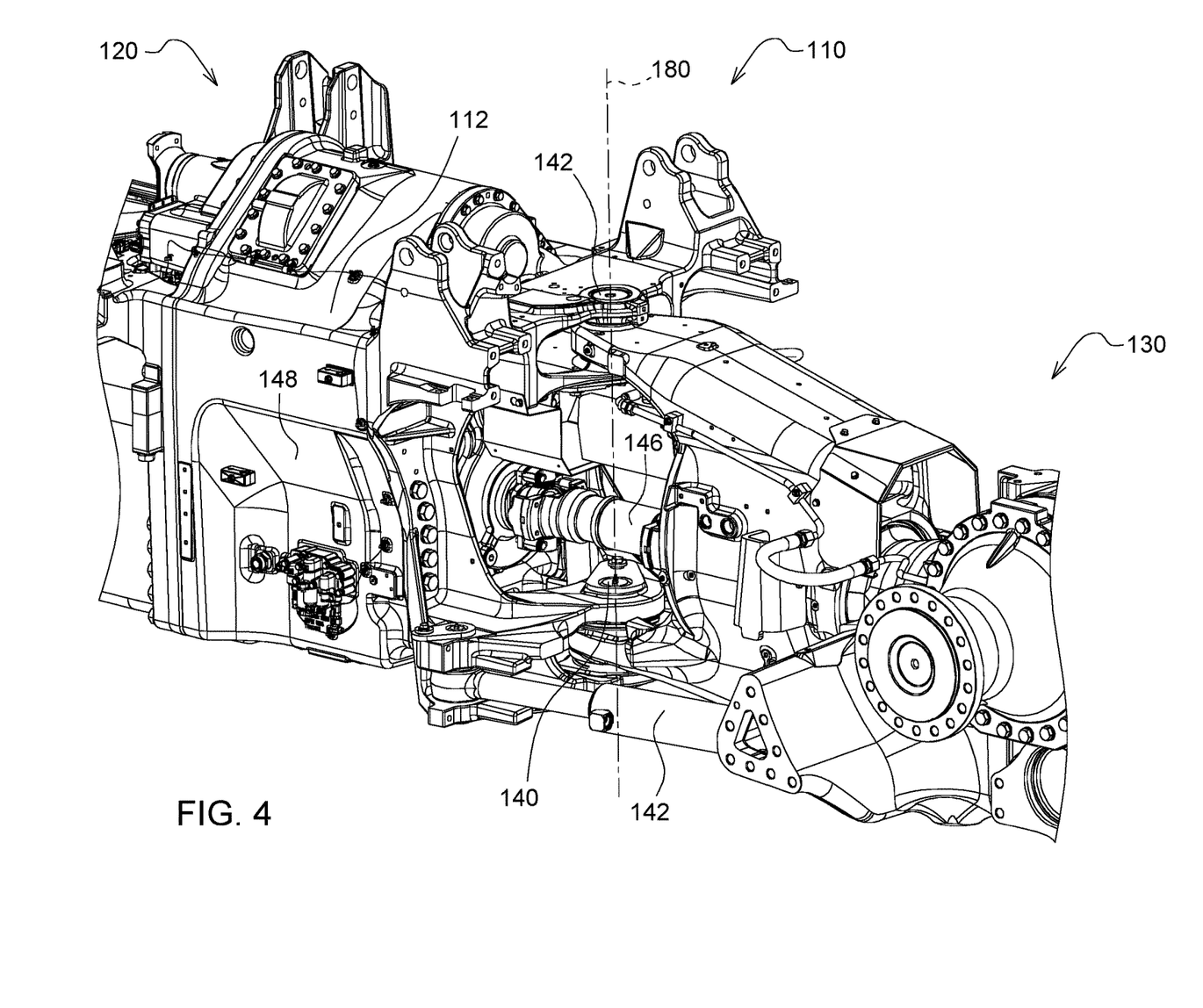
FIG. 4 is a rear perspective view of a chassis for a work vehicle, according to an implementation.
Figure 5:
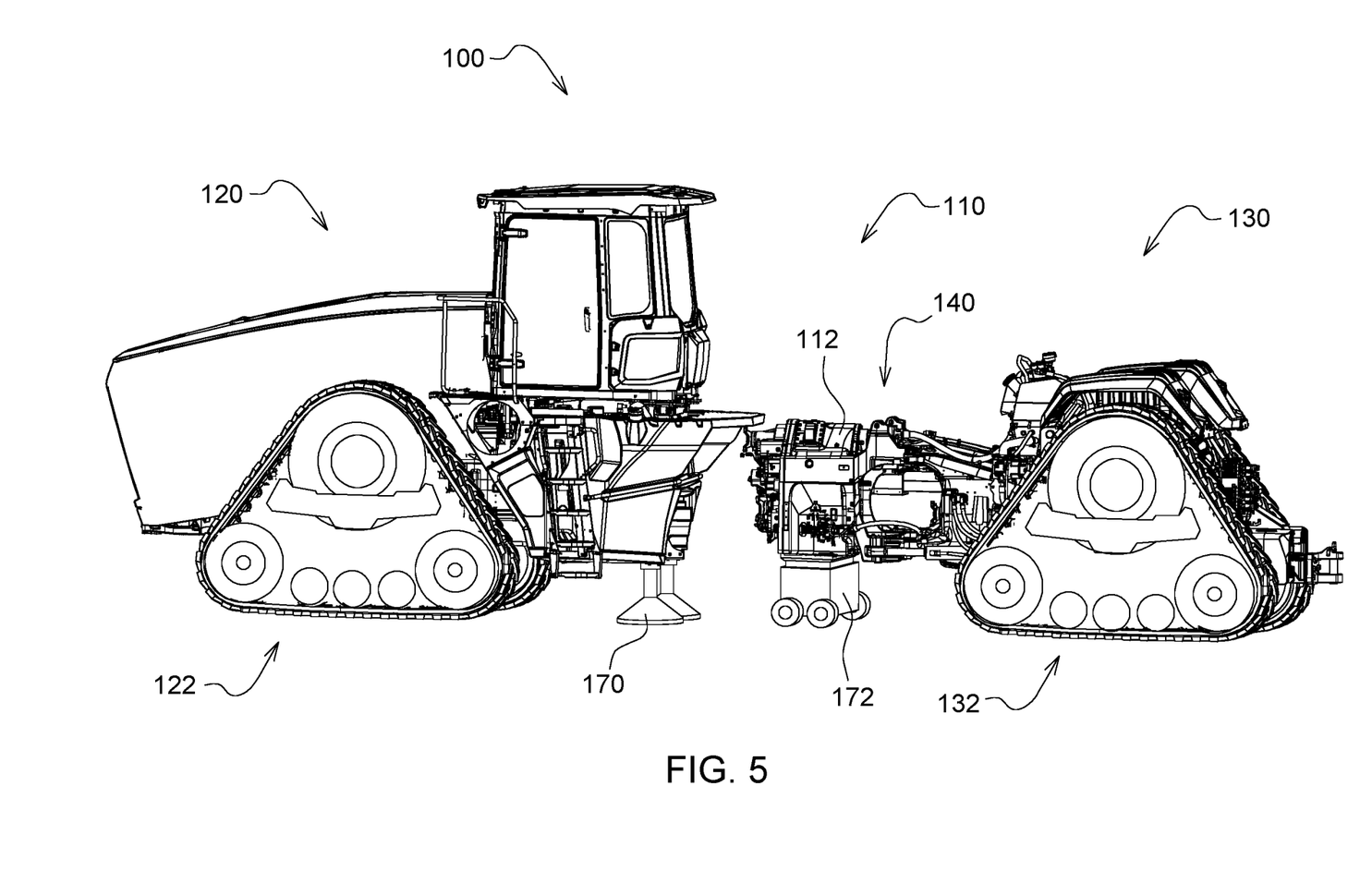
FIG. 5 is a left perspective view of a work vehicle, according to an implementation.
Figure 6:
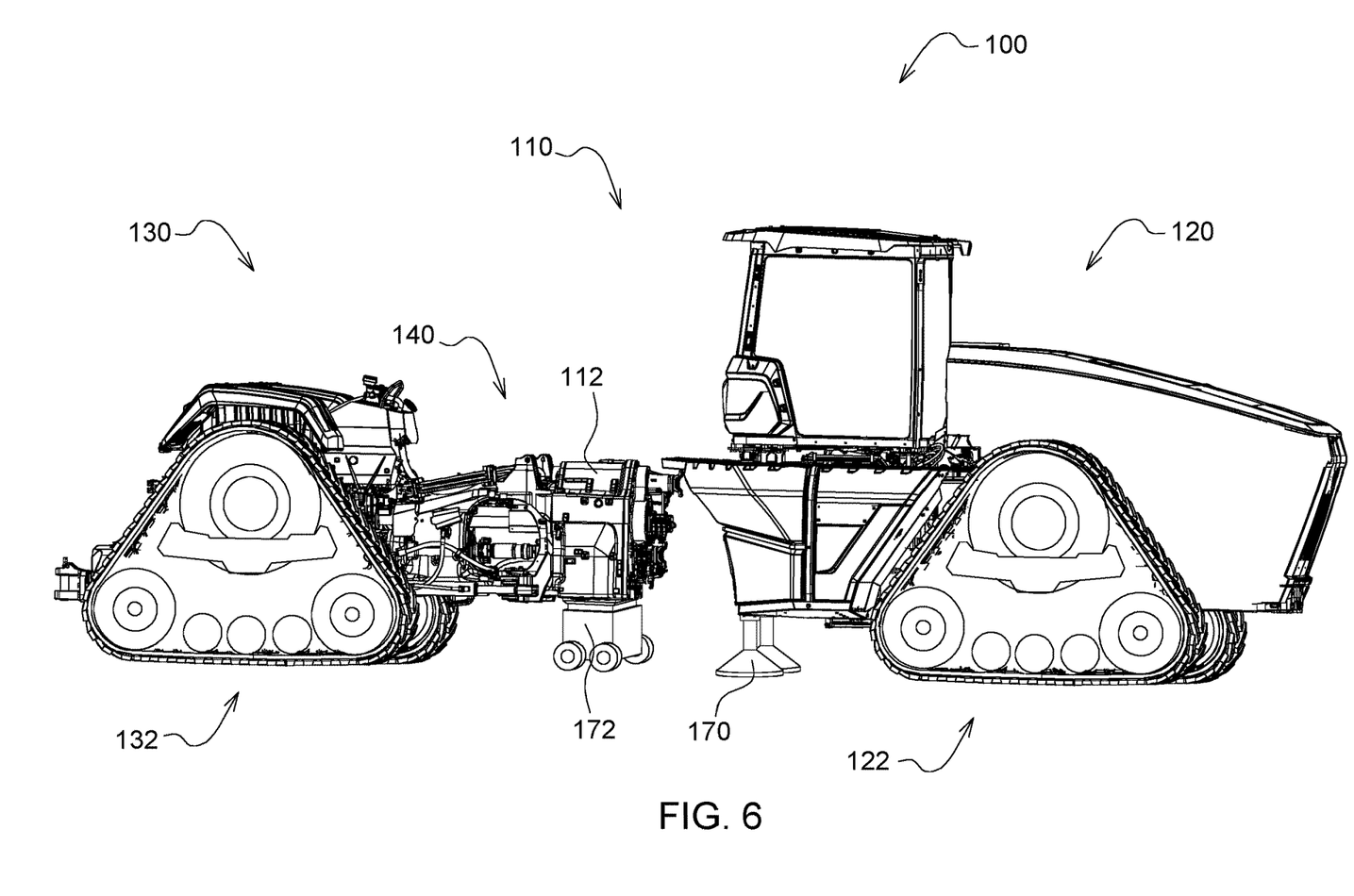
FIG. 6 is a right perspective view of a work vehicle, according to an implementation.
Figure 7:
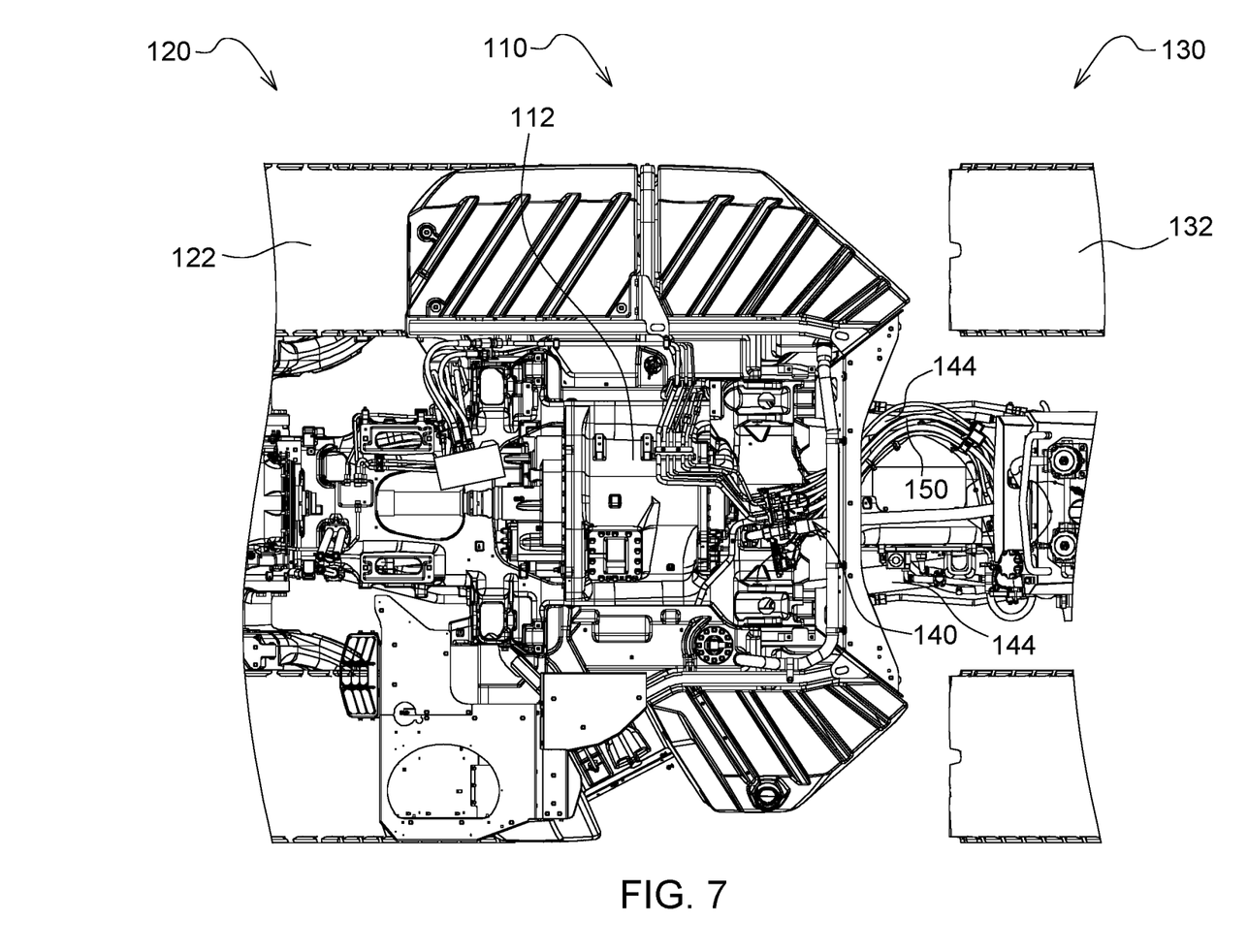
FIG. 7 is a top perspective view of a chassis for a work vehicle, according to an implementation.
Figure 8:
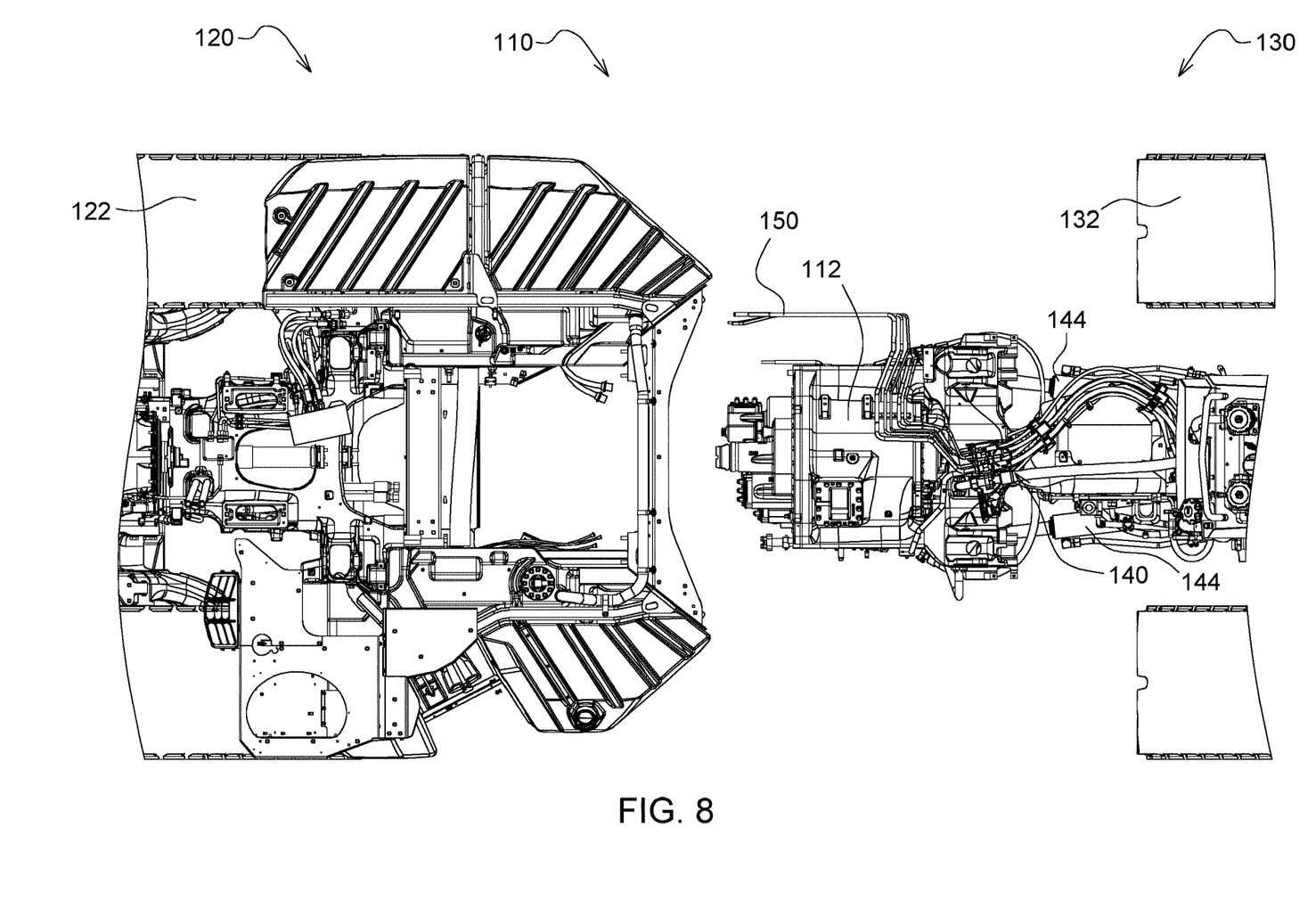
FIG. 8 is a top perspective view of a chassis for a work vehicle, according to an implementation.
Figure 9:
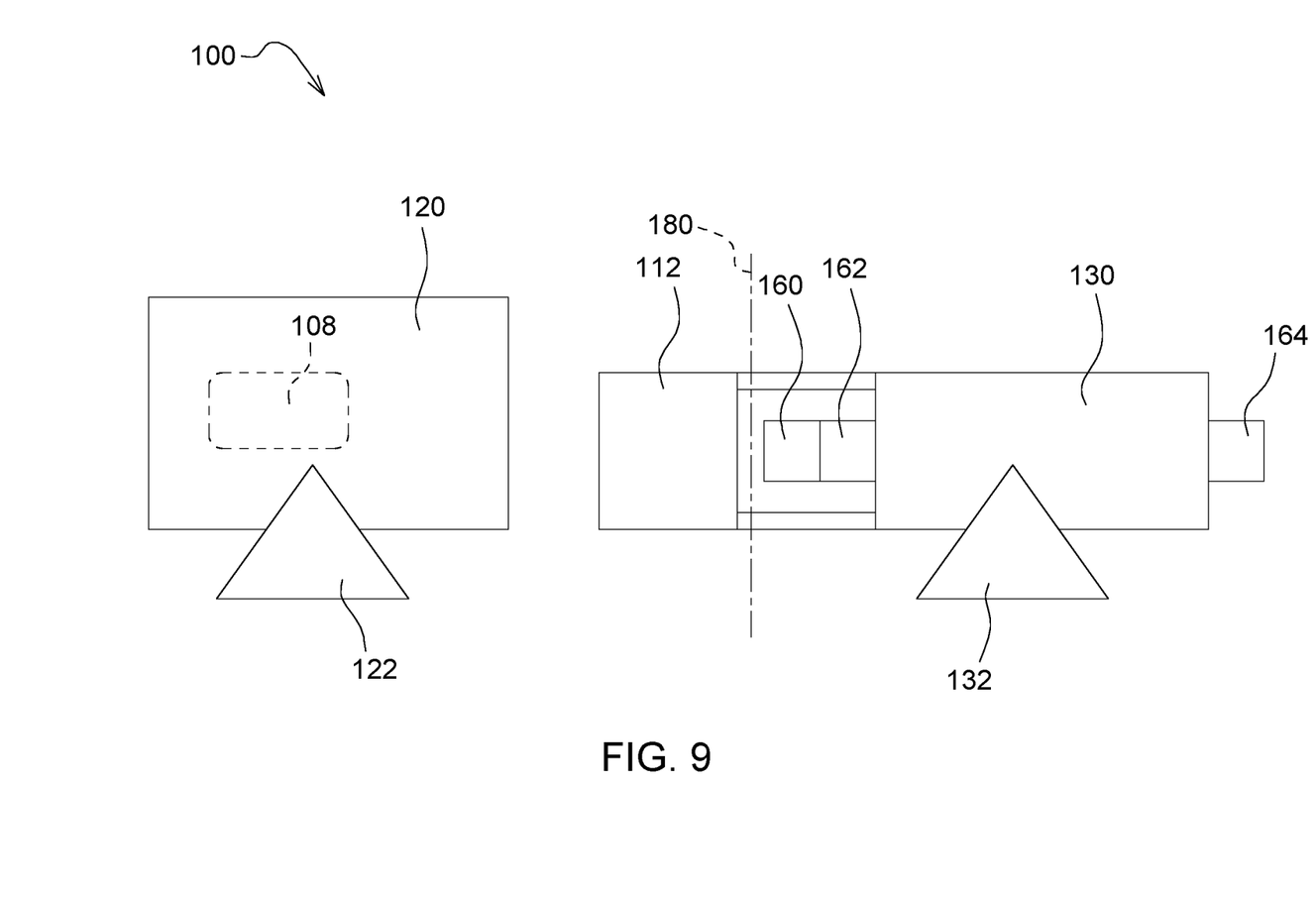
FIG. 9 is a schematic diagram of a work vehicle, according to an implementation.

With reference to FIG. 7, one or more lines, hoses, or cables 150 (e.g., hydraulic, pneumatic, electric, etc.) connect to one or more components in the front portion 120 and one or more components in the rear portion 130. The one or more lines 150 include connectors for connecting and disconnecting the one or more lines 150. FIG. 7 shows the one or more lines 150 connected, and FIG. 8 shows the one or more lines 150 disconnected.

The work vehicle 100 includes a use mode with the rear portion 130 pivotally connected to the front portion 120, as shown for example in FIGS. 1-4 and 7. The transmission 112 is operably connected to the power source 108, the front set of track assemblies 122, and the rear set of track assemblies 132. A drive shaft 146 operably connects the transmission 112 to the rear set of track assemblies 132. The one or more actuators 144 can connect to the rear set of track assemblies 132 and to the front track assemblies 122 at the transmission housing 148. In the use mode, the work vehicle 100 is arranged in a normal operating mode.

The work vehicle 100 includes a service mode with the rear portion 130 disconnected from the front portion 120, as shown for example in FIGS. 5-6 and 8-9. The transmission 112 is disconnected from the front set of track assemblies 122. The transmission 112 is removed from the front portion 120. The transmission 112 remains pivotally connected to the rear portion 130 at the one or more connections 140. The transmission 112 can rotate or pivot about the axis of rotation 180. The actuators 144 remain connected to the transmission housing 148 and the rear set of track assemblies 132. The transmission 112 can remain operably connected to or can be disconnected from the rear set of track assemblies 132. The drive shaft 146 can remain operably connected or can be removed. When the drive shaft 146 is removed, an alternate power source 160 can be operably connected to the rear set of track assemblies 132 in place of the drive shaft 146.

The alternate power source 160 generates rotational power for the rear set of track assemblies 132. The alternate power source 160 can include an electric machine and an electrical energy source (e.g., an electric drill). Alternatively, the alternate power source 160 can include a hydraulic or pneumatic tool to provide rotational power to the rear set of track assemblies 132 (e.g., a pneumatic drill). The alternate power source 160 can be operably connected to the rear set of track assemblies 132 via an alternate gearbox 162, which can include a reduction gear set. The alternate power source 160 and the alternate gearbox 162 can operably connect to the rear set of track assemblies 132 in place of the drive shaft 146 or via an alternate input shaft 164. Either or both the alternate power source 160 and the alternate gearbox 162 can be removably connected or can be installed in the rear portion 130 of the work vehicle 100.

In the service mode, a front stand or support 170 can support the front portion 120 to maintain the orientation of the front portion 120 with the ground surface. A rear stand or support 172 can support the rear portion 130 to maintain the orientation of the rear portion 130 with the ground surface. Either or both of the front and rear supports 170, 172 can include wheels or rollers.

Figure 10:
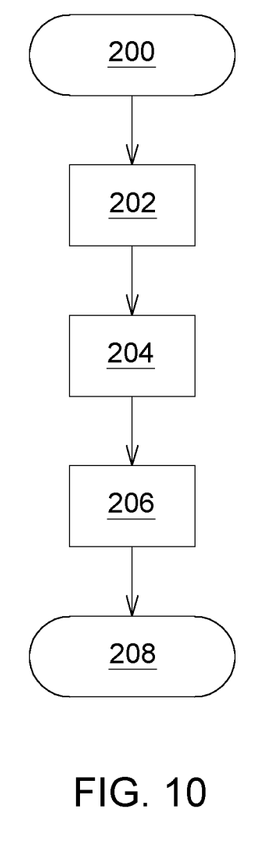
FIG. 10 is a flow diagram of a method for a work vehicle, according to an implementation.

FIG. 10 illustrates a method of removing a transmission 112 from an articulated work vehicle 100, which may be utilized in one or more of the implementations described herein and depicted in the various FIGURES. At 200, the method starts.

At 202, a rear portion 130 of the articulated work vehicle 100 is disconnected from a front portion 120 of the articulated work vehicle 100. This can include disconnecting lines, hoses, and cables 150 which travel between the front and rear portions 120, 130.

At 204, the transmission 112 is disconnected from the front portion 120 while the transmission 112 remains pivotally connected to the rear portion 130. The one or more actuators 144 remain pivotally connected to the transmission 112. A front support 170 can be positioned at or near the rear of the front portion 120 to prevent the front portion 120 from rotating or tilting towards the ground surface. A rear support 172 can be positioned at or near the front of the rear portion 130 to prevent the rear portion 130 from rotating or tilting towards the ground surface.

At 206, the rear set of track assemblies 130 are powered via an alternate power source 160 to drive the rear set of track assemblies 130 in a rearward direction and remove the transmission 112 from the front portion 120, also in a rearward direction. The rear support 172 can travel with the rear set of track assemblies 130 on or more wheels or rollers. The drive shaft 146 can be removed and the alternate power source 160 can be positioned in place of the drive shaft 146. Additionally, the alternate power source 160 can include an alternate gearbox 162. Either or both the alternate power source 160 and the alternate gearbox can be utilized in place of the drive shaft 146 or can be connected to an alternate input shaft 164, which operably connects to the rear set of track assemblies 132.

At 208, the method of removing a transmission 112 from an articulated work vehicle 100 is complete, according to one implementation. In other implementations, one or more of these steps, processes, or operations may be omitted, repeated, re-ordered, combined, or separated and are within the scope of the present disclosure.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An articulated work vehicle, comprising:
a front portion including a front set track assemblies;
a rear portion including a rear set track assemblies;
a power source installed in the front portion;
a transmission installed in the front portion;
a use mode with the rear portion pivotally connected to the front portion and the transmission operably connected to the power source, the front set of track assemblies, and the rear set of track assemblies;
a service mode with the rear portion disconnected from the front portion, the transmission disconnected from the front set of track assemblies, the transmission removed from the front portion, and the transmission remaining pivotally connected to the rear portion; and
an alternate power source operably connected to the rear set of track assemblies in the service mode.

2. The articulated work vehicle of claim 1, further comprising:
an operator station connected to the front portion.

3. The articulated work vehicle of claim 1, wherein the alternate power source operably connects via an alternate gearbox to the rear set of track assemblies in the service mode.

4. The articulated work vehicle of claim 1, further comprising:
one or more actuators pivotally connected to the transmission and the rear portion in the use mode and the service mode.

5. The articulated work vehicle of claim 1, further comprising:
a front support supporting the front portion in the service mode; and
a rear support including one or more rollers, the rear support supporting the rear portion in the service mode.

6. The articulated work vehicle of claim 1, further comprising:
a drive shaft operably connecting the transmission to the rear set of track assemblies in the use mode; and
the alternate power source operably positioned in place of the drive shaft in the service mode.

7. An articulated work vehicle, comprising:
a front portion including a front set track assemblies;
a rear portion including a rear set track assemblies;
a power source installed in the front portion;
a transmission installed in the front portion;
a use mode with the rear portion pivotally connected to the front portion and the transmission operably connected to the power source, the front set of track assemblies, and the rear set of track assemblies;
a service mode with the rear portion disconnected from the front portion, the transmission disconnected from the front set of track assemblies, the transmission removed from the front portion, and the transmission remaining pivotally connected to the rear portion; and
one or more actuators pivotally connected to the transmission and the rear portion in the use mode and the service mode.

8. The articulated work vehicle of claim 7, further comprising:
an operator station connected to the front portion.

9. The articulated work vehicle of claim 7, further comprising:
an alternate power source operably connected via an alternate gearbox to the rear set of track assemblies in the service mode.

10. The articulated work vehicle of claim 7, further comprising:
a front support supporting the front portion in the service mode; and
a rear support including one or more rollers, the rear support supporting the rear portion in the service mode.

11. The articulated work vehicle of claim 7, further comprising:
a drive shaft operably connecting the transmission to the rear set of track assemblies in the use mode; and
an alternate power source operably positioned in place of the drive shaft in the service mode.

12. An articulated work vehicle, comprising:
a front portion including a front set track assemblies;
a rear portion including a rear set track assemblies;
a power source installed in the front portion;
a transmission installed in the front portion;
a use mode with the rear portion pivotally connected to the front portion and the transmission operably connected to the power source, the front set of track assemblies, and the rear set of track assemblies;

a service mode with the rear portion disconnected from the front portion, the transmission disconnected from the front set of track assemblies, the transmission removed from the front portion, and the transmission remaining pivotally connected to the rear portion;

a front support supporting the front portion in the service mode; and a rear support including one or more rollers, the rear support supporting the rear portion in the service mode.

13. The articulated work vehicle of claim 12, further comprising:

an operator station connected to the front portion.

14. The articulated work vehicle of claim 12, further comprising:

an alternate power source operably connected via an alternate gearbox to the rear set of track assemblies in the service mode.

15. The articulated work vehicle of claim 12, further comprising:

a drive shaft operably connecting the transmission to the rear set of track assemblies in the use mode; and an alternate power source operably positioned in place of the drive shaft in the service mode.

* * * * *